United States Patent
Srivastava et al.

(10) Patent No.: US 9,071,136 B2
(45) Date of Patent: Jun. 30, 2015

(54) SYSTEM AND METHOD FOR SUPPRESSION OF PEAKING IN AN EXTERNAL LC FILTER OF A BUCK REGULATOR

(71) Applicant: QUALCOMM Incorporated, San Diego, CA (US)

(72) Inventors: Ankit Srivastava, San Diego, CA (US); Vijayakumar Dhanasekaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 13/645,280

(22) Filed: Oct. 4, 2012

(65) Prior Publication Data

US 2013/0257398 A1  Oct. 3, 2013

Related U.S. Application Data

(60) Provisional application No. 61/618,476, filed on Mar. 30, 2012.

(51) Int. Cl.
| | |
|---|---|
| *G05F 1/563* | (2006.01) |
| *H02M 3/156* | (2006.01) |
| *H02M 1/00* | (2007.01) |
| *H02M 1/12* | (2006.01) |

(52) U.S. Cl.
CPC ...... *H02M 3/156* (2013.01); *H02M 2001/0025* (2013.01); *H02M 2001/0032* (2013.01); *H02M 1/12* (2013.01); *Y02B 70/16* (2013.01)

(58) Field of Classification Search
USPC ................................................ 323/271–290
See application file for complete search history.

(56) References Cited

U.S. PATENT DOCUMENTS

| | | | |
|---|---|---|---|
| 5,949,225 A * | 9/1999 | Sawtell ......................... | 323/284 |
| 7,394,236 B2 | 7/2008 | Chapuis et al. | |
| 7,482,791 B2 | 1/2009 | Stoichita et al. | |
| 7,576,527 B1 | 8/2009 | Zhang et al. | |
| 7,919,952 B1 * | 4/2011 | Fahrenbruch ................ | 323/222 |

(Continued)

FOREIGN PATENT DOCUMENTS

| | | |
|---|---|---|
| DE | 102007043322 A1 | 12/2008 |
| JP | 2009260592 A | 11/2009 |
| WO | 2008111347 A1 | 9/2008 |

OTHER PUBLICATIONS

International Search Report and Written Opinion—PCT/US2013/034739—ISA/EPO—Mar. 6, 2014.

*Primary Examiner* — Adolf Berhane
*Assistant Examiner* — Nusrat Quddus

(57) ABSTRACT

Disclosed are systems and methods for suppressing voltage peaking in a buck regulator. In one aspect, a buck regulator comprises: a pulse-width modulator (PWM) that generates a pulsed signal; a switch operable to selectively connect the regulator to a DC power supply in response to the pulsed signal and output a pulsed output DC signal; a filter for filtering out high frequency noise from the pulsed output DC signal and generating a regulated output signal; an integrator for comparing the pulsed output DC signal with a reference voltage signal and generating an error signal for input to the PWM; a subtractor operable to subtract the reference voltage signal from the filtered output signal to generate an error feedback signal; and an adder operable to add the error feedback signal to the error signal for input to the pulse-width modulator in order to suppress voltage peaks in the filtered output signal.

15 Claims, 6 Drawing Sheets

(56) References Cited

U.S. PATENT DOCUMENTS

| | | |
|---|---|---|
| 8,018,210 B2 | 9/2011 | Chen et al. |
| 8,054,056 B2 * | 11/2011 | Coleman .................. 323/282 |
| 8,773,872 B2 * | 7/2014 | Adragna .................. 363/21.02 |
| 2003/0030486 A1 | 2/2003 | Noro et al. |
| 2005/0162223 A1 | 7/2005 | Maejima |
| 2010/0027301 A1 | 2/2010 | Hoyerby |

* cited by examiner

SYSTEM AND METHOD FOR SUPPRESSION OF PEAKING IN AN EXTERNAL LC FILTER OF A BUCK REGULATOR

CLAIM OF PRIORITY UNDER 35 U.S.C. §119

The present Application for Patent claims priority to Provisional Application No. 61/618,476, entitled "Damping of peaking in external LC filter for classD Buck regulator for classH PA" filed Mar. 30, 2012, and assigned to the assignee hereof and hereby expressly incorporated by reference herein.

TECHNICAL FIELD

This disclosure relates generally to voltage regulator circuits and more specifically to the systems and methods for suppression of peaking in an external filter of a buck regulator.

BACKGROUND

Switched mode power supplies (SMPS) are known in the art to convert an available direct current (DC) level voltage to another DC level voltage. A SMPS provides a regulated DC output voltage to a load by selectively storing energy in an output inductor coupled to the load by switching the flow of current into the output inductor. A buck converter is one particular type of SMPS that includes two power switches that are typically provided by MOSFET transistors. An inductor plus capacitor (LC) filter is used to reduce the ripple in output voltage. A pulse width modulation (PWM) control circuit is used to control the gating of the power switches in an alternating manner to control the flow of current in the output inductor. The PWM control circuit uses feedback signals reflecting the output voltage and/or current level to adjust the duty cycle applied to the power switches in response to changing load conditions.

Generally, buck regulators have high efficiency and are often used to regulate power for audio power amplifiers (PA), such as Class H PA. A buck regulator generates a supply voltage having envelope that varies continuously with an audio input signal of the PA. For high audio input signal amplitudes, a buck regulator typically operates in Class D mode, also known as a pulse-width modulation (PWM) mode. For lower audio input signals, the buck regulator typically switches to a pulse-frequency modulation (PFM) mode. In audio applications, a buck regulator typically includes an external low-pass LC filter having resonance frequency (Fres) of about 62 KHz (e.g., L=3 uH C=2.2 uF) for filtering out high-frequency components of the pulsed DC signal generated by the buck regulator. However, if during mode switching of the buck regulator, input audio signals close to Fres are injected into the LC filter, the filter output may exhibit peaking, which is undesirable for typical audio applications. Therefore, there is a need for a mechanism to suppress output voltage peaking in the LC filter of the buck regulator.

SUMMARY

The following presents a simplified summary of one or more aspects of mechanisms for suppressing output voltage peaking in the LC filter of a buck regulator. This summary is not an extensive overview of all contemplated aspects of the invention, and is intended to neither identify key or critical elements of the invention nor delineate the scope of any or all aspects thereof. Its sole purpose is to present some concepts of one or more aspects in a simplified form as a prelude to the more detailed description that is presented later.

Generally, a conventional buck regulator may be modified to include an internal error feedback loop which suppresses peaking in the external LC filter and reduces regulator's settling time. In one aspect, a modified buck regulator circuit comprises: a pulse-width modulator (PWM) operable to generate a pulse-width modulated signal; a switch operable to selectively connect the circuit to a DC power supply in response to the pulse-width modulated signal and output a pulsed output DC signal; a filter, having a resonance frequency, the filter coupled to the switch for filtering out high frequency noise from the pulsed output DC signal and generate a regulated output signal; an integrator operable to compare the pulsed output DC signal with a reference voltage signal and generate an error signal for input to the pulse-width modulator; a subtractor operable to subtract the reference voltage signal from the filtered output signal to generate an error feedback signal; and an adder operable to add the error feedback signal to the error signal for input to the pulse-width modulator in order to substantially suppress voltage peaks in the filtered output signal at the frequency near the resonance frequency of the filter.

In another aspect, a modified buck regulator circuit comprises: a pulse-width modulator operable to generate a pulse-width modulated signal; a switch operable to selectively connect the circuit to a DC power supply in response to the pulse-width modulated signal and output a pulsed output DC signal; a filter, having a resonance frequency, the filter coupled to the switch for filtering out high frequency noise from the pulsed output DC signal and generate a regulated output signal; an integrator operable to compare the pulsed output DC signal with a reference voltage signal to generate an error signal, subtract the reference voltage signal from the filtered output signal, and add the difference signal to the error signal for input to the pulse-width modulator in order to substantially suppress voltage peaks in the filtered output signal at the frequency near the resonance frequency of the filter.

Yet in another aspect, a method for regulating power supply voltage using the above-described buck regulators comprises: generating a pulse-width modulated signal; selectively connecting to a DC power supply in response to the pulse-width modulated signal to output a pulsed output DC signal; filtering out high frequency noise from the pulsed output DC signal to generate a regulated output signal; comparing the pulsed output DC signal with a reference voltage signal to generate an error signal; subtracting the reference voltage signal from the filtered output signal to generate an error feedback signal; and adding the error feedback signal to the error signal in order to substantially suppress voltage peaks in the filtered output signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects of the invention will hereinafter be described in conjunction with the appended drawings, provided to illustrate and not to limit the disclosed aspects, wherein like designations denote like elements, and in which.

DETAILED DESCRIPTION

Figure 1:
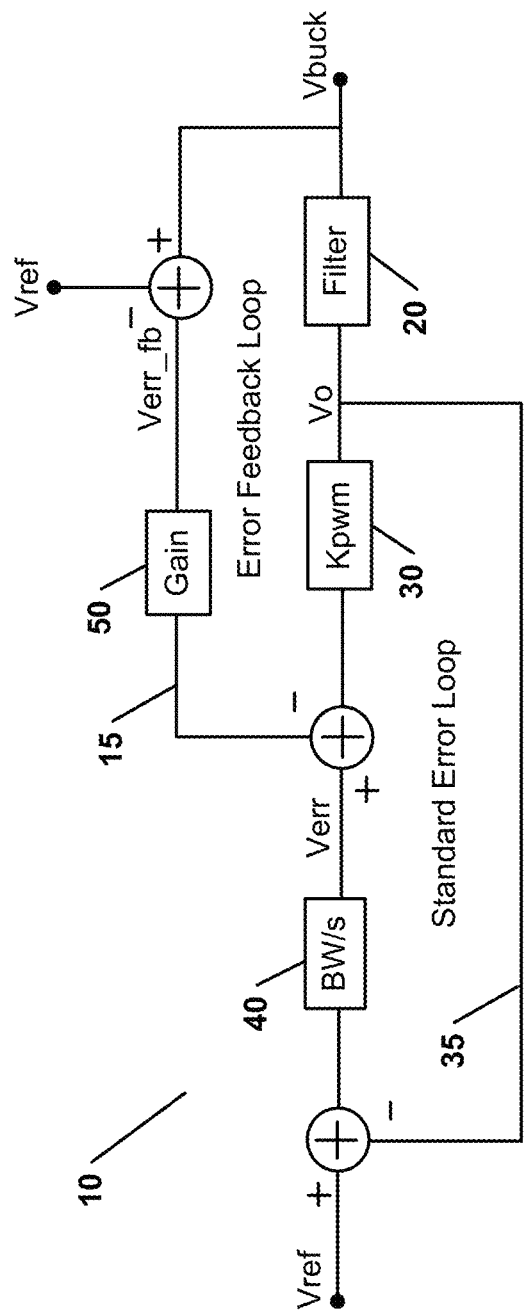
FIG. 1 is an illustration of a closed loop response diagram of a modified buck regulator circuit in accordance with one aspect of the invention.

Disclosed are systems and methods for suppressing peaking in an external LC filter of a buck regulator. In one aspect, a convention buck regulator may be modified to include an internal error feedback loop which suppresses peaking in the external LC filter and reduces regulator's settling time. FIG. 1 illustrates a closed loop response diagram 10 of a modified buck regulator circuit in accordance with one aspect of the present invention. Particularly, to suppress peaking in the output signal Vbuck of the buck regulator, the output signal Vbuck is fed back via an error feedback loop 15, subtracted from a reference voltage Vref, adjusted using gain control circuit 50, and added to error signal Verr, which is generated through a standard error loop 35 of the buck regulator. The new error feedback loop 15 facilitates substantial damping of peaking in the output voltage Vbuck. The variable gain control circuit 50 adjusts magnitude of the error feedback signal Verr_fb and corresponding magnitude of peak damping.

The closed loop response diagram of FIG. 1, can be represented by the following close loop response function according to one aspect of the invention:

$$\frac{Vbuck}{Vref} = \frac{(BW + \text{gain}*s)(1/LCf)}{\frac{s^2}{Kpwm} + s^2\left(\frac{R}{Kpwm*L} + BW\right) + s\left(\frac{1}{Kpwm*LCf} + BW\frac{R}{L} + \frac{\text{gain}}{LCf}\right) + \frac{BW}{LCf}}$$

Figure 2:
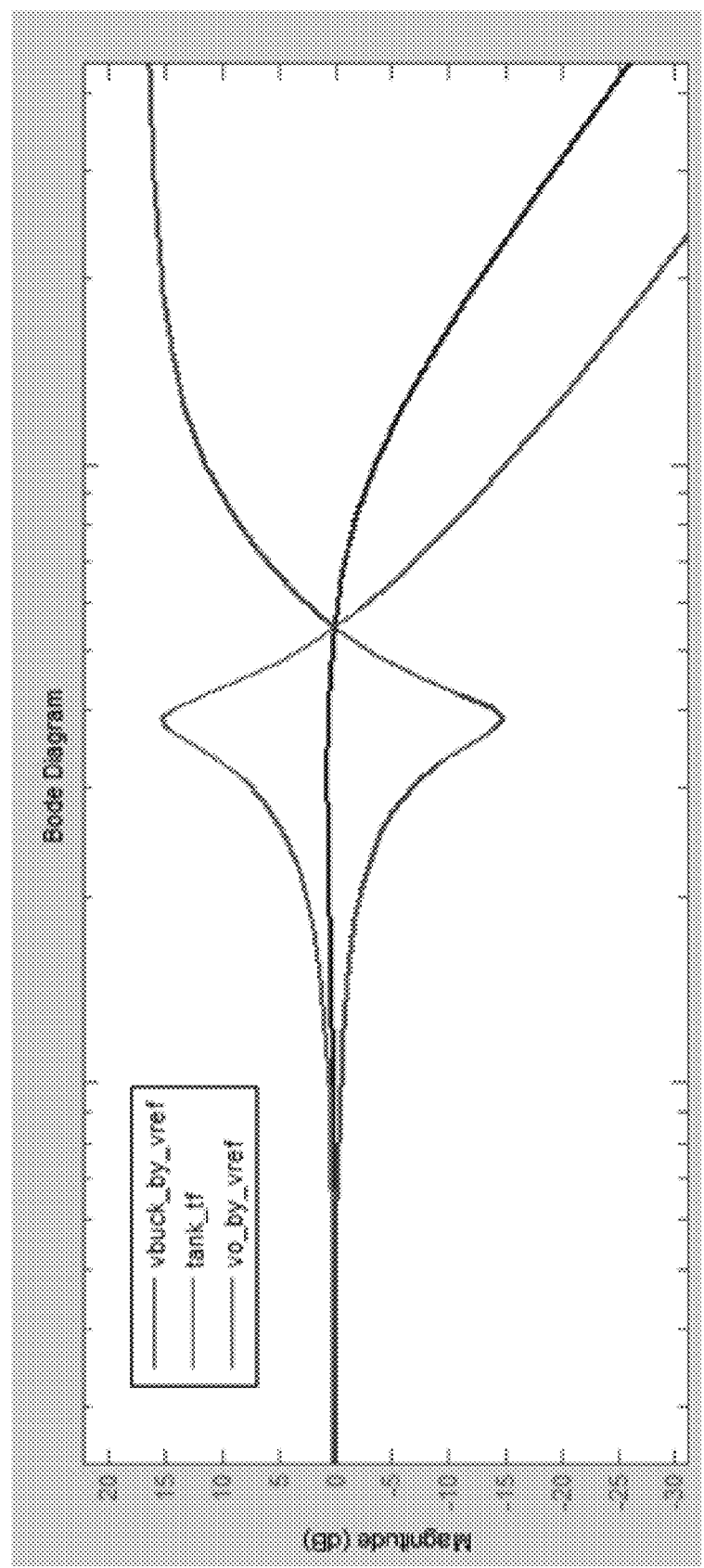
FIG. 2 is a bode diagram showing suppression of peaking in the output signal of the modified buck regulator circuit.
Figure 3:
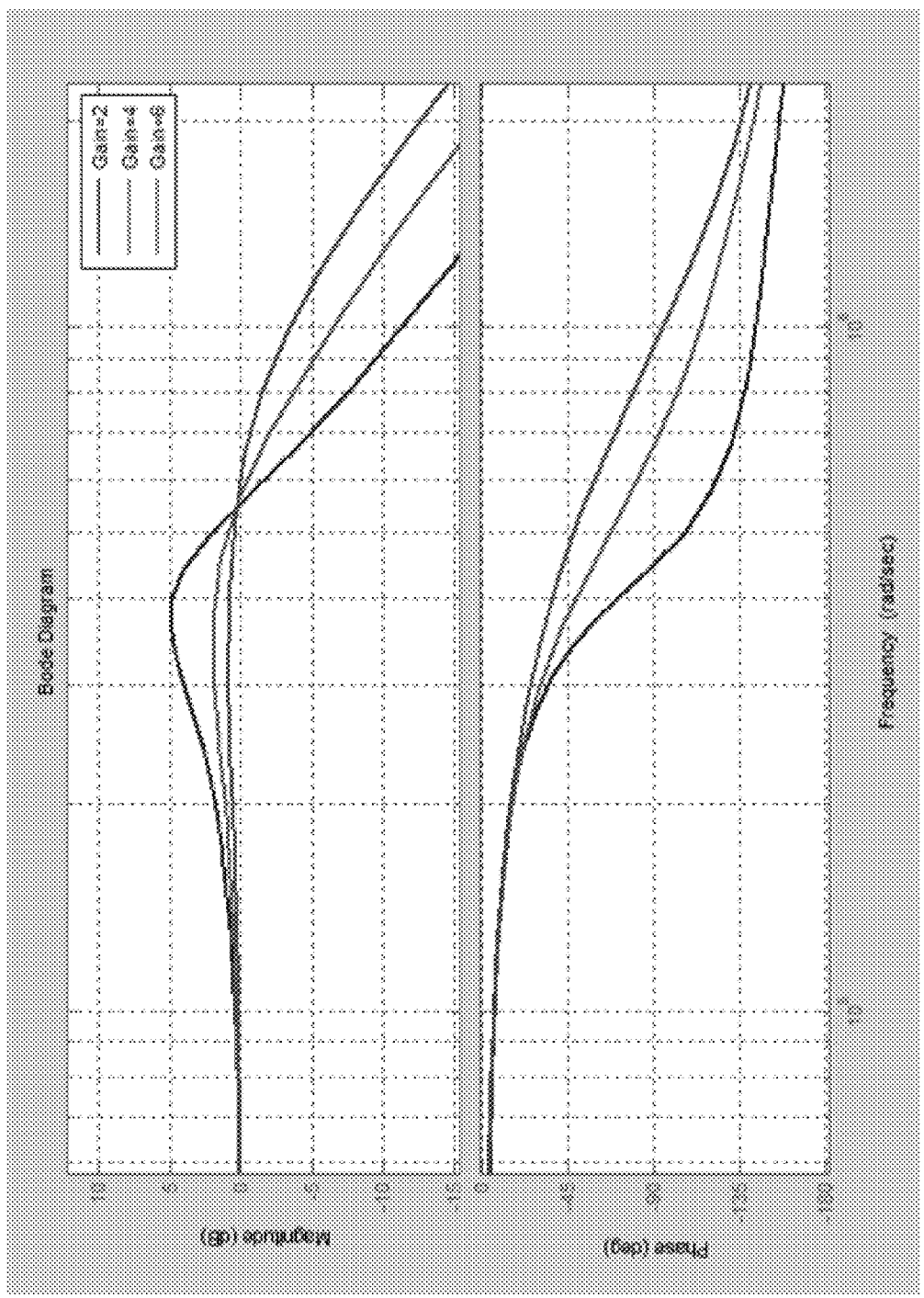
FIG. 3 is a bode diagram showing changes in magnitude of peaking suppression as a function of gain of the error feedback loop of the modified buck regulator circuit.

In FIG. 1 and above expression, BW 40 is a gain of the integrator. Kpwm 30 is a gain of the Pulse Width Modulator. L is a value of inductor of the filter 20. C is a value of the capacitor of the filter 20. Gain 50 is a variable gain of the error feedback loop 15, whose value can vary for example from 2 to 6. In one aspect, gain set to 6 would be sufficient to efficiently damp voltage peaking at the frequency near the resonance frequency of the filter 20. FIG. 2 illustrates a bode graph showing frequency response of the output signal Vbuck of the modified buck regulator. As can be seen from the graph, the peaking in the output signal Vbuck (middle plot) is effectively suppressed. FIG. 3 shows changes in the magnitude of peaking suppression as a function of the gain of the error feedback loop 15. As can be seen from the upper graph, increase in the value of the gain from 2 to 6 increases suppression of peaking.

In another aspect, the closed loop response of a modified buck regulators shown in FIG. 1, can be represented by the following close loop response function:

$$\frac{Vbuck}{Vref} = \frac{BW + s*\text{gain}}{BW} * Gtank * \frac{\frac{BW*Kpwm}{s(1+Gtank*\text{gain}*Kpwm)}}{1 + \frac{BW*Kpwm}{s(1+Gtank*\text{gain}*Kpwm)}}$$

$$Gtank = \frac{\frac{1}{LCf}}{s^2 + \frac{sR}{L} + \frac{1}{LCf}}$$

In the above expression, gain can be set to 6 to efficiently damp the peaking of the system.

Figure 4:
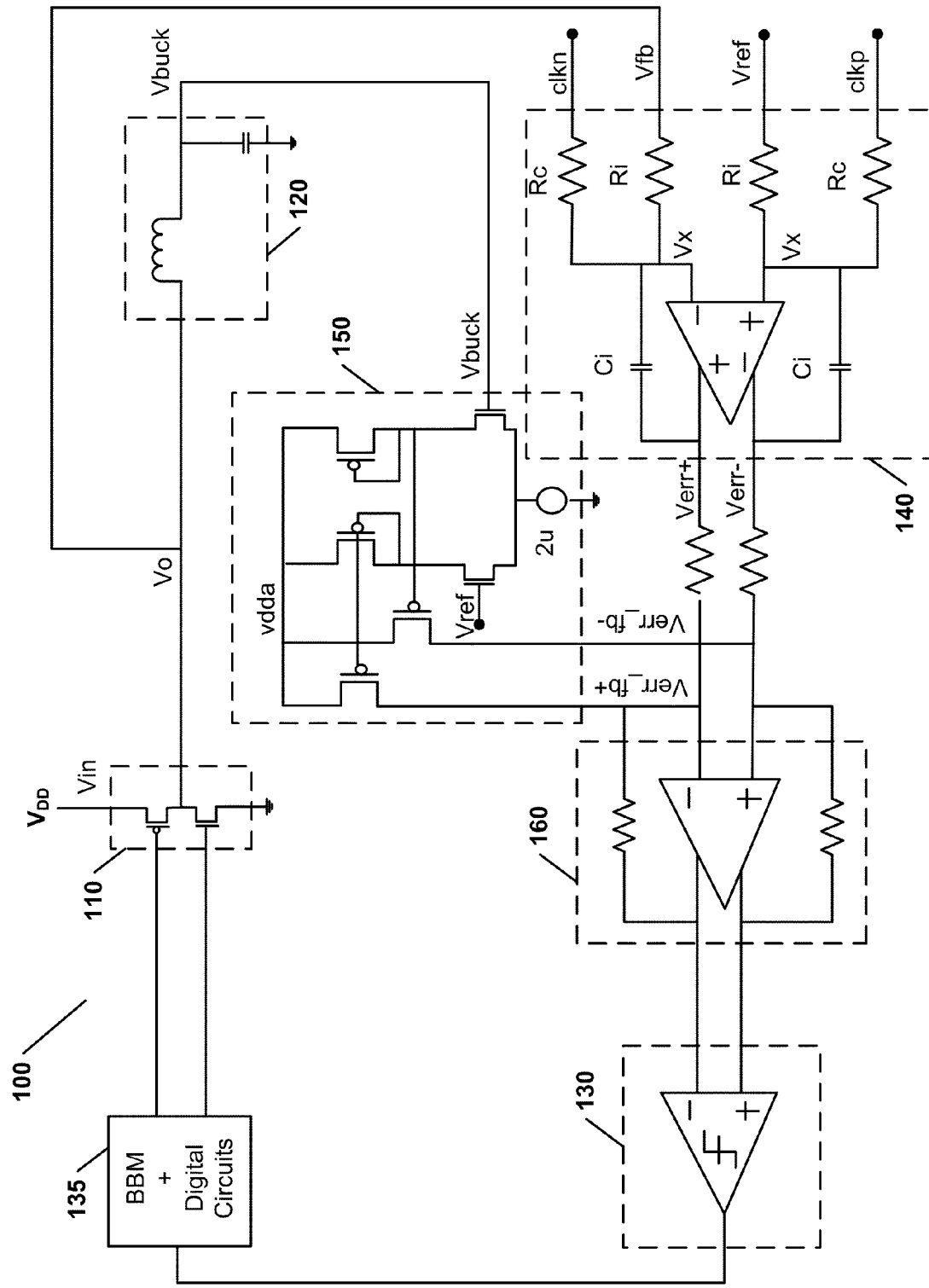
FIG. 4 is an illustration of one aspect of a modified buck regulator circuit.

FIG. 4 illustrates one example embodiment of a modified buck regulator circuit 100 for controlling a Class H audio power amplifier. The buck regulator 100 is configured to operate as a Class D switched mode power supply (SMPS). The buck regulator circuit 100 includes a switch 110 for selectively connecting the circuit 100 to a DC power supply VDD and operable to generate a pulsed output DC signal Vo. The switch 110 may be implemented as a pair of complimentary MOSFETS. The pulsed output DC signal Vo has an average value substantially equal to the required output voltage. The circuit 100 further includes a pulse-width modulator (PWM) 130 operable to provide a pulse-width modulated signal for controlling operation of the switch 110. The PWM 130 varies the duty cycle of the pulsed output signal Vo by controlling the operation of the switch 110. The circuit 130 may optionally include a standard break-before-make (BBM) circuit 135, which facilitates smoother operation of the switch 110. The circuit 100 further includes an integrator 140 operable to receive pulsed output signal Vo, as a feedback signal Vfb, and a reference signal Vref. The integrator 140 compares the pulsed output signal Vo with the reference signal Vref and outputs an error signal Verr to the PWM 130 to maintain the duty cycle of pulsed output signal Vo equal to the reference voltage Vref. The circuit 100 further includes a LC filter 120 coupled to the switch 110 for removing the unwanted pulsed frequency components from the pulsed output signal Vo and generating a filtered DC output signal Vbuck to the PA. The filter 120 includes a series inductors and a shunt capacitor.

To suppress possible peaking in the filtered DC output signal Vbuck generated by the filter 120 during mode switching of the buck regulator circuit, the circuit 100 further includes a damping feedback circuit comprising a subtractor 150 and adder 160 according to one example embodiment. The subtractor 150 receives and subtracts the filtered DC output signal Vbuck and the reference signal Vref to generate an error feedback signal Verr_fb. The resulted error feedback signal Verr_fb is then added to the error signal Verr in the adder 160, whereby substantially damping voltage peaking in the filtered DC output signal Vbuck during mode switching of the buck regulator circuit 100. In one aspect, the subtractor 150 may be implemented as a differential mirror amplifier. In one aspect, the adder 160 may be implemented as an inverting amplifier. The adder 160 may include a variable gain control circuit for adjusting magnitude of the error feedback signal Verr_fb and corresponding magnitude of peak damping. In one aspect, to effectively suppress peaking in the output voltage Vbuck, values of various circuit elements can be set as follows: Ri=200K, Rc=0.5*Ri, Ci=3.2 p. Other values of components can be used in alternative aspects of the invention.

Figure 5:
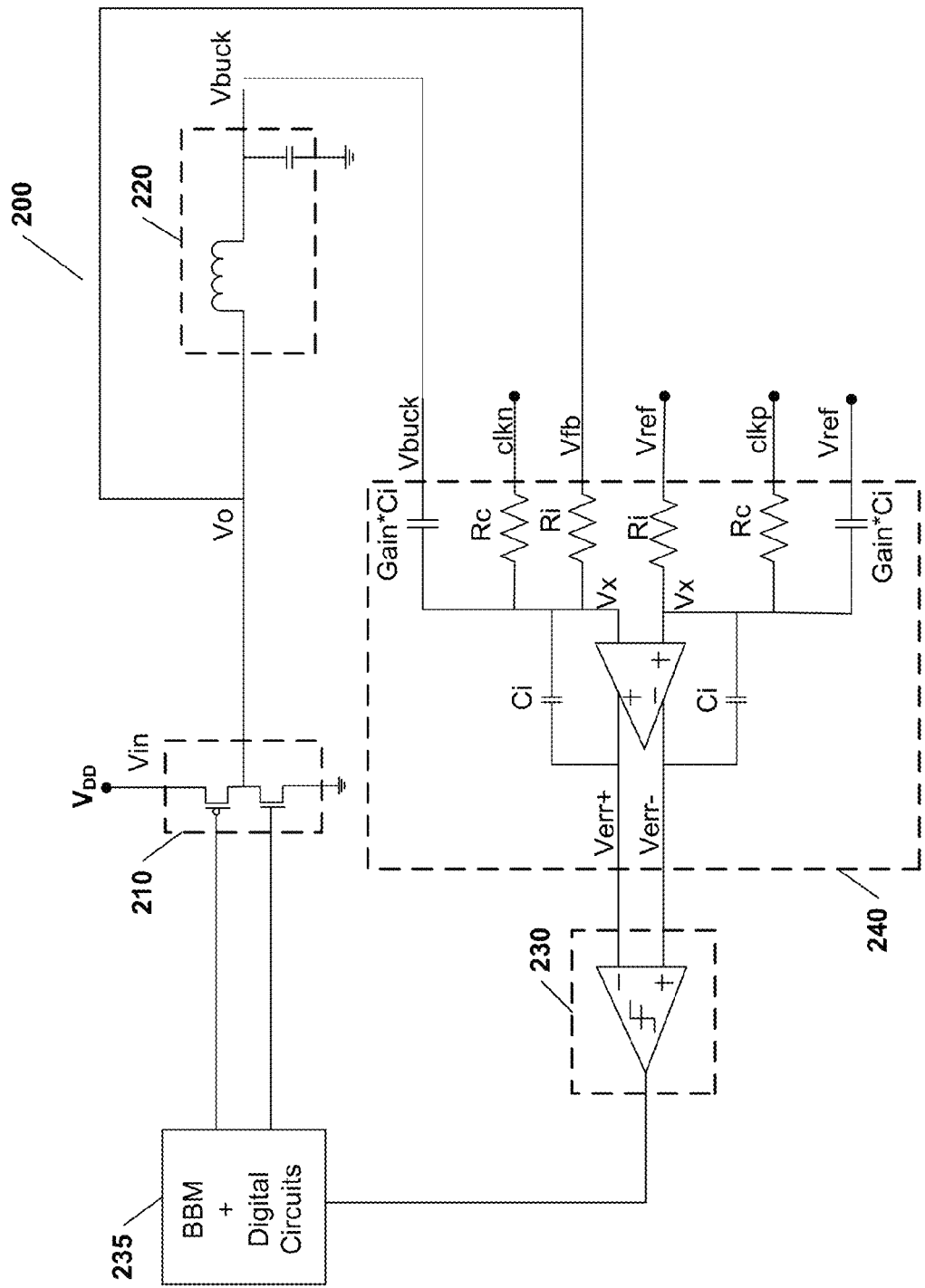
FIG. 5 is an illustration of another aspect of the modified buck regulator circuit.

FIG. 5 illustrates another example embodiment of the modified buck regulator circuit 200. The circuit 200 does not have a separate subtractor and adder, but the functions of these components are performed by the integrator 240. Particularly, the integrator 240 receives the filtered DC output signal Vbuck, the pulsed output signal Vo and the reference signal Vref. The filtered DC output signal and an extra Vref signals are capacitively coupled to opamp input of the integrator 140 in FIG. 4. An opamp with capacitive coupled input and capacitive coupled feedback acts as a gain amplifier whose gain is given by (GainCi/Ci)*(Vbuck−Vref), which can be simplified after cancelling Ci from numerator and denominator to Gain*(Vbuck−Vref). The effect of adding this capacitive coupled branch in to the integrator is equivalent to implementing Error feedback loop in FIG. 4 and adding it's output on top of the integrator output. The gains of the Error feedback path can be adjusted using variable capacitances Gain*Ci. The typical value of Gain for suppressing peaking is around 5. The integrator 240 outputs to the PWM 230 an error signal Verr which will substantially suppress peaking artifacts in the filtered DC output signal Vbuck of the buck regulator circuit 200. In one aspect, values of various circuit elements to effectively suppress peaking in the output voltage Vbuck can be set as follows: Ri=200K, Rc=0.5*Ri, Ci=3.2 p, and Gain=5. Other values of components can be used in alternative aspects.

Figure 6:
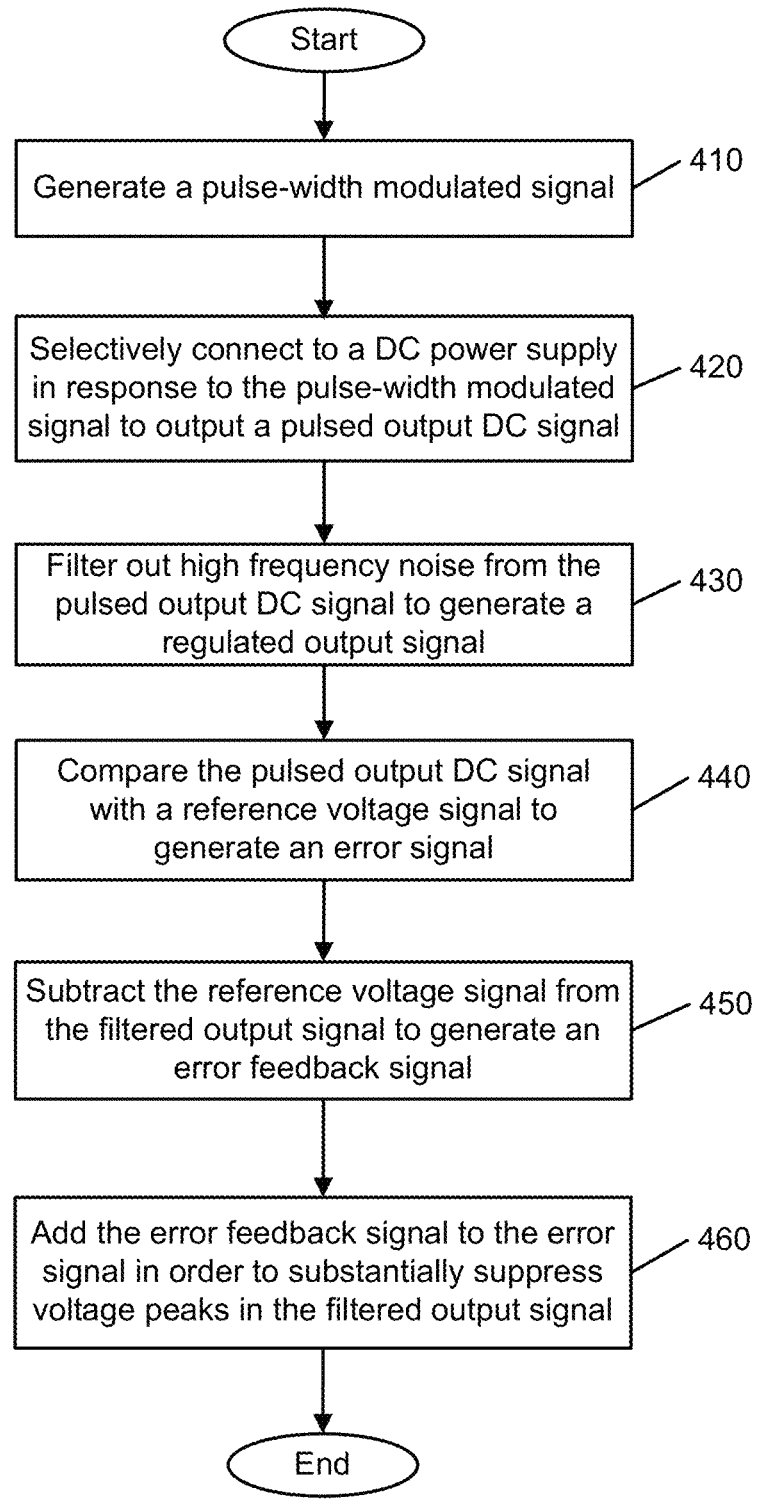
FIG. 6 is an illustration of an example methodology for regulating power supply voltage using modified buck regulator circuit in accordance with one aspect of the invention.

FIG. 6 is an illustration of an example methodology for suppressing peaking in the power supply voltage using modified buck regulator circuit in accordance with one aspect of the invention. At step 410, the PWM of the modified buck regulator generates a pulse-width modulated signal which controls operation of the transistor switches. At step 420, the switches under the control of the PWM signal selectively connect the buck regulator circuit to a DC power supply and output a pulsed output DC signal Vo to the LC filter. At step 430, the LC filter filters out high frequency noise from the pulsed output DC signal Vo to generate a regulated output signal Vbuck. At step 440, the integrator compares the pulsed output signal Vo with the reference signal Vref and outputs an error signal Verr to the PWM for maintaining the duty cycle of pulsed output signal Vo equal to the reference voltage Vref. At step 450, the subtractor subtracts the reference voltage signal Vref from the filtered output signal Vbuck to generate an error feedback signal Verr_fb. At step 460, the adder adds the error feedback signal Verr_fb to the error signal Verr in order to suppress voltage peaks in the filtered output signal Vbuck.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means known in the art.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise.

The invention claimed is:

1. A power regulator circuit comprising:
    a pulse-width modulator operable to generate a pulse-width modulated signal;
    a switch operable to selectively connect the circuit to a DC power supply in response to the pulse-width modulated signal and output a pulsed output DC signal;
    a filter, having a resonance frequency, the filter coupled to the switch for filtering out high frequency noise from the pulsed output DC signal and generate a regulated output signal;
    an integrator operable to compare the pulsed output DC signal with a reference voltage signal and generate an error signal for input to the pulse-width modulator;
    a subtractor operable to subtract the reference voltage signal from the filtered output signal to generate an error feedback signal; and
    an adder operable to add the error feedback signal to the error signal for input to the pulse-width modulator in order to substantially suppress voltage peaks in the filtered output signal at the frequency near the resonance frequency of the filter.

2. A power regulator circuit comprising:
    a pulse-width modulator operable to generate a pulse-width modulated signal;
    a switch operable to selectively connect the circuit to a DC power supply in response to the pulse-width modulated signal and output a pulsed output DC signal;
    a filter, having a resonance frequency, the filter coupled to the switch for filtering out high frequency noise from the pulsed output DC signal and generate a regulated output signal;
    an integrator operable to compare the pulsed output DC signal with a reference voltage signal and generate an error signal for input to the pulse-width modulator;
    a subtractor operable to subtract the reference voltage signal from the filtered output signal to generate an error feedback signal, wherein the subtractor includes a differential mirror amplifier having a variable gain, wherein varying of the gain of the amplifier controls magnitude of suppression of voltage peaks in the filtered output signal; and
    an adder operable to add the error feedback signal to the error signal for input to the pulse-width modulator to substantially suppress voltage peaks in the filtered output signal at the frequency near the resonance frequency of the filter.

3. The circuit of claim 1, wherein the switch includes a pair of complementary MOSFETs.

4. The circuit claim 1, wherein the filter includes a low pass LC filter having resonance frequency of about 62 KHz.

5. The circuit of claim 1, wherein the circuit is a Class D switched mode power supply.

6. The circuit of claim 1, wherein the circuit operates in pulse-width modulation mode for high power signals and in pulse-frequency modulation mode for low power signals.

7. A power regulator circuit comprising:
    a pulse-width modulator operable to generate a pulse-width modulated signal;
    a switch operable to selectively connect the circuit to a DC power supply in response to the pulse-width modulated signal and output a pulsed output DC signal;
    a filter, having a resonance frequency, the filter coupled to the switch for filtering out high frequency noise from the pulsed output DC signal and generate a regulated output signal;
    an integrator operable to compare the pulsed output DC signal with a reference voltage signal to generate an error signal, subtract the reference voltage signal from the filtered output signal, and add the difference signal to the error signal for input to the pulse-width modulator in order to substantially suppress voltage peaks in the filtered output signal at the frequency near the resonance frequency of the filter.

8. The circuit of claim 7, wherein the integrator further includes at least one variable capacitor for increasing gain of at least one of the filtered output signal and the reference signal.

9. The circuit of claim 7, wherein the switch includes a pair of complementary MOSFETs.

10. The circuit claim 7, wherein the filter includes a low pass LC filter having resonance frequency of about 62 KHz.

11. The circuit of claim 7, wherein the circuit is a Class D switched mode power supply.

12. The circuit of claim 7, wherein the circuit operates in pulse-width modulation mode for high power signals and in pulse-frequency modulation mode for low power signals.

13. A method for regulating output of a power supply, the circuit comprising:
    generating a pulse-width modulated signal;
    selectively connecting to a DC power supply in response to the pulse-width modulated signal to output a pulsed output DC signal;
    filtering out high frequency noise from the pulsed output DC signal to generate a regulated output signal;
    comparing the pulsed output DC signal with a reference voltage signal to generate an error signal;
    subtracting the reference voltage signal from the filtered output signal to generate an error feedback signal; and
    adding the error feedback signal to the error signal in order to substantially suppress voltage peaks in the filtered output signal.

14. A computer program product for regulating output of a power supply, comprising:
    a computer-readable medium comprising:
    a first set of codes for causing a pulse-width modulator to generate a pulse-width modulated signal;

a second set of codes for causing a switch to selectively connect to a DC power supply in response to the pulse-width modulated signal to output a pulsed output DC signal;

a thirds set of codes for causing a filter to filter out high frequency noise from the pulsed output DC signal to generate a regulated output signal;

a fourth set of codes for causing an integrator to compare the pulsed output DC signal with a reference voltage signal to generate an error signal;

a fifth set of codes for causing a subtractor to subtract the reference voltage signal from the filtered output signal to generate an error feedback signal; and a sixth set of codes for causing an adder to add the error feedback signal to the error signal in order to substantially suppress voltage peaks in the filtered output signal.

15. An apparatus for regulating output of a power supply, the circuit comprising:

means for generating a pulse-width modulated signal;

means for selectively connecting to a DC power supply in response to the pulse-width modulated signal to output a pulsed output DC signal;

means for filtering out high frequency noise from the pulsed output DC signal to generate a regulated output signal;

means for comparing the pulsed output DC signal with a reference voltage signal to generate an error signal;

means for subtracting the reference voltage signal from the filtered output signal to generate an error feedback signal; and means for adding the error feedback signal to the error signal in order to substantially suppress voltage peaks in the filtered output signal.

* * * * *